United States Patent
Martin Perez (10) Patent No.: US 10,242,165 B2
(45) Date of Patent: Mar. 26, 2019

(54) OPTIMIZED SECURITY SELECTIONS

(71) Applicant: GOOGLE INC., Mountain View, CA (US)

(72) Inventor: Alberto Martin Perez, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 137 days.

(21) Appl. No.: 15/332,703

(22) Filed: Oct. 24, 2016

(65) Prior Publication Data

US 2018/0113998 A1    Apr. 26, 2018

(51) Int. Cl.
*G06F 21/10* (2013.01)
*H04L 29/06* (2006.01)
*H04L 29/08* (2006.01)
*G06F 21/62* (2013.01)

(52) U.S. Cl.
CPC ............ *G06F 21/105* (2013.01); *G06F 21/10* (2013.01); *H04L 65/4069* (2013.01); *H04L 67/02* (2013.01); *G06F 21/62* (2013.01); *G06F 2221/0753* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 7,484,220 B2 | 1/2009 | Kelley et al. | |
| 7,600,234 B2 | 10/2009 | Dobrowski et al. | |
| 8,132,242 B1 | 3/2012 | Wu | |
| 2005/0097615 A1* | 5/2005 | Moradi | G06Q 10/107 725/90 |
| 2006/0002255 A1* | 1/2006 | Weng | G11B 27/034 369/47.1 |
| 2006/0041647 A1* | 2/2006 | Perham | H04L 67/2847 709/220 |
| 2006/0089912 A1 | 4/2006 | Spagna et al. | |
| 2006/0112179 A1* | 5/2006 | Baumeister | H04L 12/2805 709/226 |

(Continued)

OTHER PUBLICATIONS

International Search Report and Written Opinion Received for PCT Application No. PCT/US2017/052504, dated Nov. 20, 2017, 12 pages.

*Primary Examiner* — Malcolm Cribbs
(74) *Attorney, Agent, or Firm* — Brake Hughes Bellermann LLP (57) ABSTRACT

A method includes initiating play of a media file, reading a first key associated with a device, reading a second key associated with an application, and determining, based on the first key and the second key, whether a characteristic associated with playing the media file is higher for the playing of the media file by the web browser as compared to playing of the media file by the application. Upon determining the characteristic associated with playing the media file is higher for the playing of the media file by the web browser, initiating execution of the web browser on the device, and playing the media file with the web browser. Upon determining the characteristic associated with playing the media file is higher for the playing of the media file by the application, initiating execution of the application on the device, and playing the media file with the application.

20 Claims, 4 Drawing Sheets

(56) References Cited

U.S. PATENT DOCUMENTS

| | | | |
|---|---|---|---|
| 2007/0014397 A1* | 1/2007 | Ukeda | G06F 21/10 |
| | | | 380/30 |
| 2009/0307270 A1* | 12/2009 | Baek | G06F 17/30023 |
| 2012/0210225 A1* | 8/2012 | McCoy | H04N 21/25891 |
| | | | 715/719 |
| 2012/0265803 A1* | 10/2012 | Ha | G06F 17/30902 |
| | | | 709/203 |
| 2013/0024816 A1 | 1/2013 | Bender | |
| 2013/0142043 A1* | 6/2013 | Tapia | H04W 28/0268 |
| | | | 370/230 |
| 2013/0283392 A1 | 10/2013 | Mirashrafi et al. | |
| 2014/0280861 A1 | 9/2014 | Anderson et al. | |
| 2015/0006673 A1* | 1/2015 | Nair | H04N 5/765 |
| | | | 709/217 |
| 2015/0113476 A1 | 4/2015 | Deutsch et al. | |
| 2015/0381714 A1* | 12/2015 | Hawkins | G06F 9/4843 |
| | | | 715/739 |
| 2017/0005790 A1* | 1/2017 | Brockmann | H04L 9/08 |
| 2017/0054733 A1* | 2/2017 | Koch | H04L 63/105 |

\* cited by examiner

OPTIMIZED SECURITY SELECTIONS

FIELD

Embodiments relate to playing of media files.

BACKGROUND

Often security selections or access control measures are taken to restrict play (e.g., access to) or restrict quality (e.g., reduce resolution) of when playing the media or media file on a device. The security selections or access control measures can be used to prevent unauthorized access to, for example, copyright protected media.

SUMMARY

Example embodiments describe systems and methods to optimize playing of a media file on a device.

In a general aspect, a method includes initiating play of a media file, reading a first key associated with a device configured to execute a web browser, reading a second key associated with an application configured to execute on the device, and determining, based on the first key and the second key, whether a characteristic associated with playing the media file is higher for the playing of the media file by the web browser as compared to playing of the media file by the application. Upon determining the characteristic associated with playing the media file is higher for the playing of the media file by the web browser, initiating execution of the web browser on the device, and playing the media file with the web browser. Upon determining the characteristic associated with playing the media file is higher for the playing of the media file by the application, initiating execution of the application on the device, and playing the media file with the application.

In another general aspect, a device includes a processor, a first memory configured to store a first key, and a second memory. The second memory is configured to store instructions that when executed by the processor cause the device to initiate play of a media file, read a first key associated with the device configured to execute a web browser, read a second key associated with an application configured to execute on the device, and determine, based on the first key and the second key, whether a characteristic associated with playing the media file is higher for the playing of the media file by the web browser as compared to playing of the media file by the application. Upon determining the characteristic associated with playing the media file is higher for the playing of the media file by the web browser, initiating execution of the web browser on the device, and playing the media file with the web browser. Upon determining the characteristic associated with playing the media file is higher for the playing of the media file by the application, initiating execution of the application on the device, and playing the media file with the application.

In still another general aspect, a non-transitory computer readable medium includes code segments stored thereon, the code segments, when executed by a processor cause the processor to initiate a play of a media file, read a first key associated with the device configured to execute a web browser, read a second key associated with an application configured to execute on the device, and determine, based on the first key and the second key, whether a characteristic associated with playing the media file is higher for the playing of the media file by the web browser as compared to playing of the media file by the application. Upon determining the characteristic associated with playing the media file is higher for the playing of the media file by the web browser, initiating execution of the web browser on the device, and playing the media file with the web browser. Upon determining the characteristic associated with playing the media file is higher for the playing of the media file by the application, initiating execution of the application on the device, and playing back the media file with the application.

Implementations can include one or more of the following features. For example, the characteristic associated with playing the media file can be resolution. The first key can be stored in a non-volatile memory of the device. The first key can be a Digital Rights Management (DRM) key or DRM certificate. The first key can be used to determine if the device has been tampered with. The first key can be stored on a license server, and the first key can be read using an application programming interface (API) executing together with the web browser, the API is configured to communicate with the license server and to read the first key from the license server. The first key can be an encrypted media extension key. The playing of the media file can be initiated using the application. The playing of the media file can be initiated using the web browser. The second key can be associated with a user account of a user of the application. The second key can be associated with quality of service for a user account of a user of the application, and the quality of service can indicate the resolution associated with playing of the media file by the application.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

During playing of media, content and/or a media file (e.g., a movie), a user experience can be based on characteristics associated with playing the media content and/or media file on a device. For example, resolution, frames per second (fps), dynamic range or high dynamic range (HDR), dimension (2D, 3D and the like), sound quality, subtitles, codecs and the like can impact the user experience. For example, the higher the resolution of the playing of the media file, the better the user experience. Therefore, should more than one option be available for playing of the media file, the user experience can be improved by automatically (e.g., without user action) selecting an option for playing that displays at a higher resolution as compared to other available options.

Figure 1:
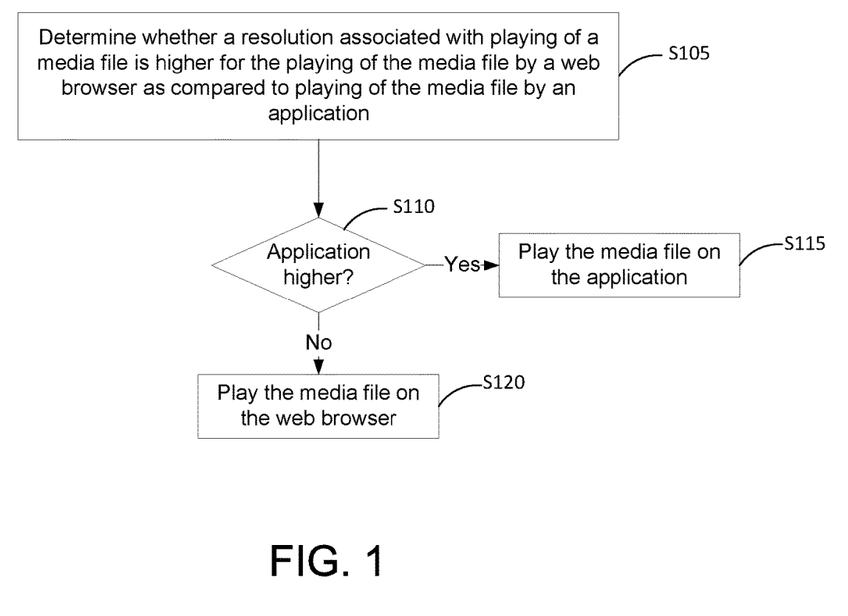
FIG. 1 illustrates a flowchart of a method for selecting a play option for playing of a media file according to at least one example embodiment.
Figure 2:
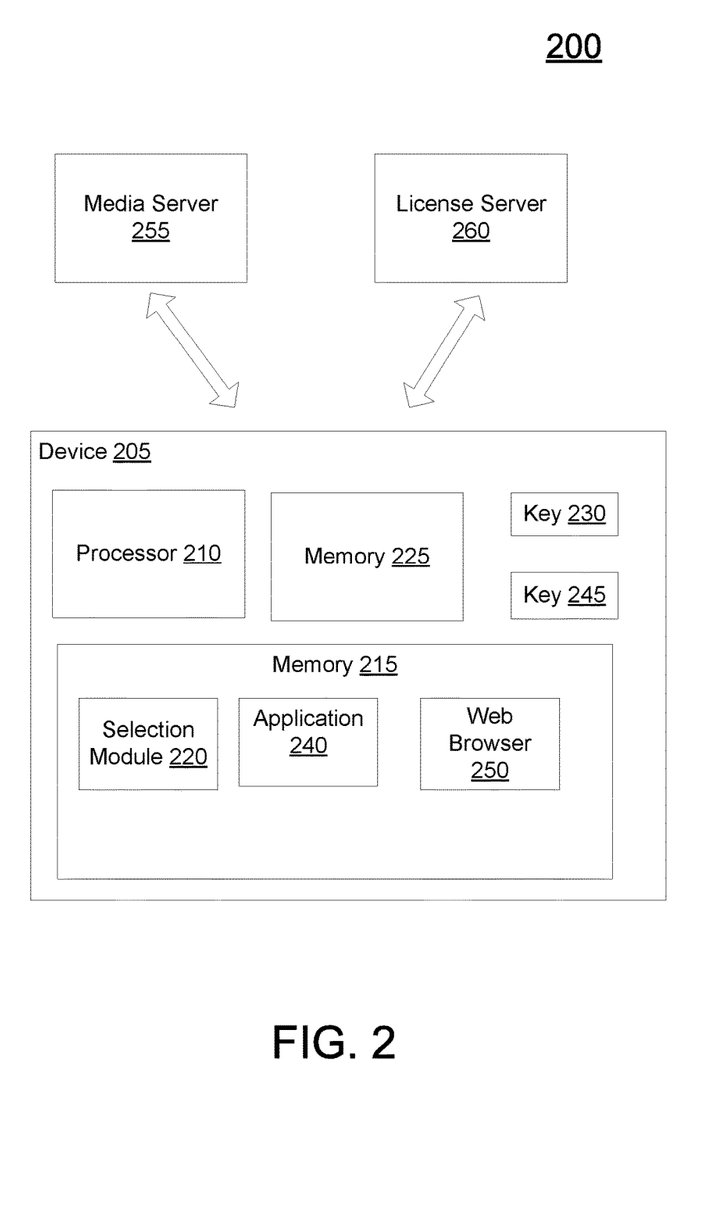
FIG. 2 illustrates a block diagram of a system according to at least one example embodiment.
Figure 3:
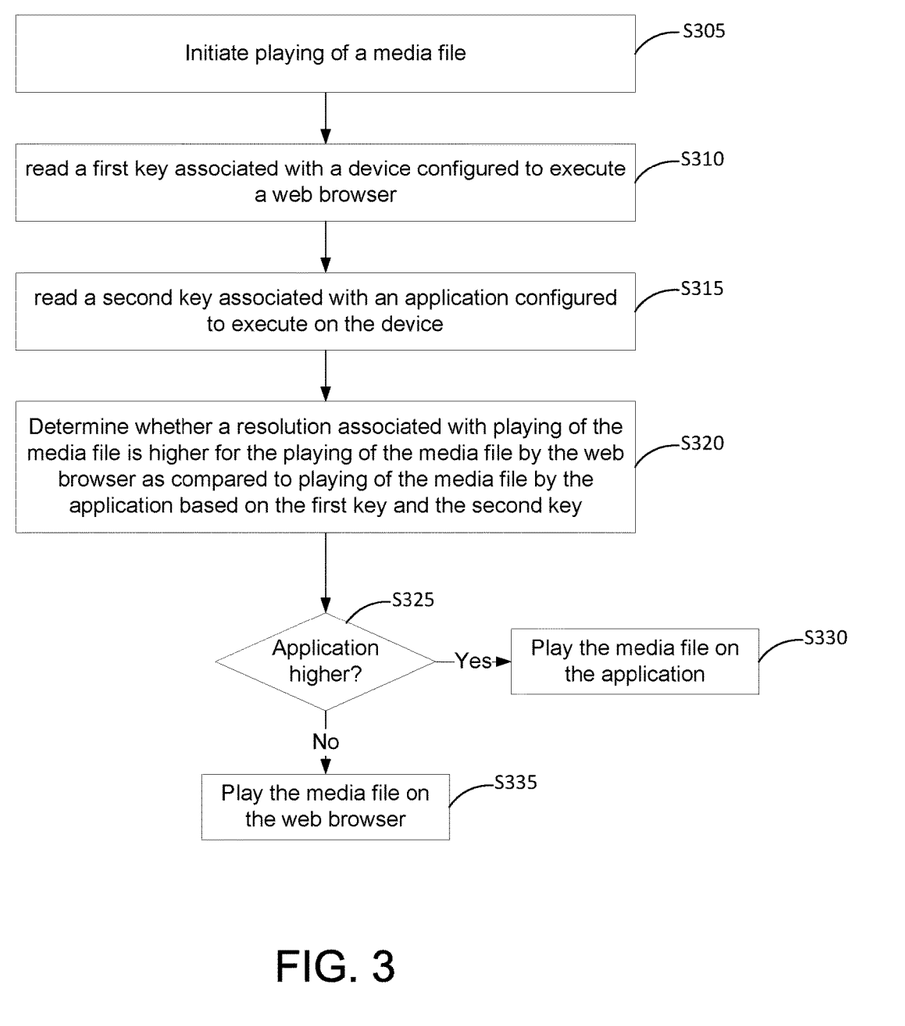
FIG. 3 illustrates another flowchart of a method for selecting a play option for playing of a media file according to at least one example embodiment.
Figure 4:
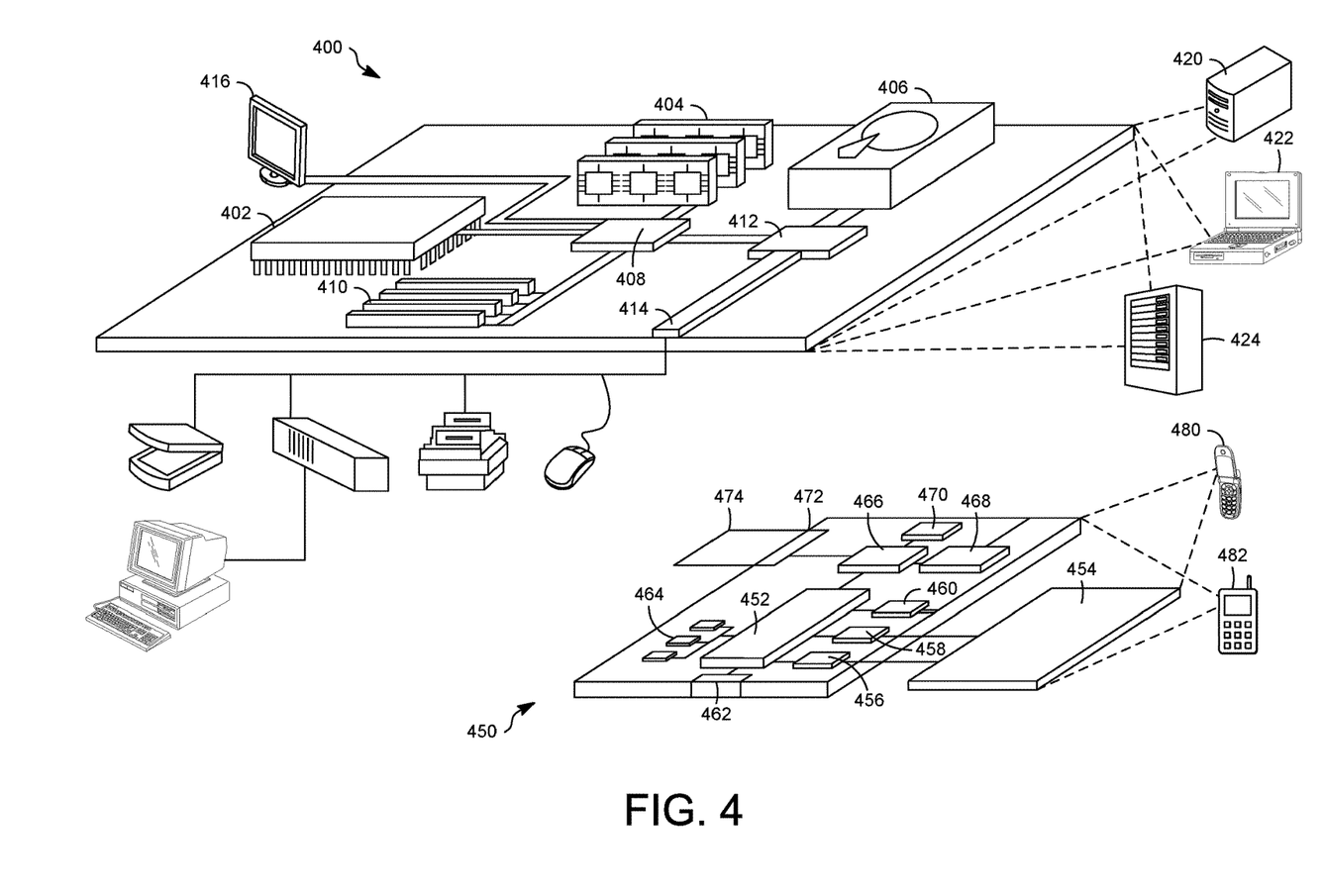
FIG. 4 shows an example of a computer device and a mobile computer device according to at least one example embodiment.

FIGS. 1 and 3 are flowcharts of methods according to example embodiments. The steps described with regard to FIGS. 1 and 3 may be performed due to the execution of software code stored in a memory (e.g., memory 215) associated with an apparatus (e.g., as shown in FIGS. 2 and 4 (described below)) and executed by at least one processor (e.g., processor 210) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 1 and 3.

FIG. 1 illustrates a flowchart of a method for selecting a play option for playing of a media file according to at least one example embodiment. As shown in FIG. 1, in step S105 a determination is made as to whether a resolution (and/or other characteristics) associated with playing of a media file is higher for the playing of the media file by a web browser as compared to playing of the media file by an application. For example, a streaming media (e.g., video or movie) service can allow access to a media file via, at least, (1) a web page using a web browser executing on a device (e.g., a mobile phone) and (2) an application (not including the web browser, although the application can have web based functionality similar to a web browser) configured to execute on the same device. The remainder of FIG. 1 will be described with regard to resolution for clarity purposes. However, it will be understood that other characteristics associated with playing the media file on the device alone and/or in combination with resolution are within the scope of this disclosure.

The streaming media service can deliver (e.g., communicate via a network) the media file at a different resolution based on whether the media file is to be played back by the application or the web browser. The determination can be based on, for example, at least one key (e.g., an activation key, a security key, an encryption key and/or the like). The key can be associated with the device or the application. The key can have an associated quality of service (QoS) indicating the resolution (and/or other characteristics) associated with the key. The key can include metadata indicating the associated QoS within the key itself and/or the key can include a link (or other mechanism) used to access or acquire the associated QoS should the associated QoS be stored separate from the key.

If the playing of the media file by the application has a higher resolution (yes, in step S110), in step S115 the media file is played back using the application. Otherwise (no, in step S110), in step 120 the media file is played back using the web browser. If the application and the web browser have a same associated resolution, playing could be accomplished using either the application or the web browser. For example, if playing of the media file is initiated independent of the application and the web browser (e.g., via a link in an email) and the application has a higher associated resolution, the media file is played back using the application. Further, if playing of the media file is initiated by one of the application or the web browser and the other of the application or the web browser has a higher associated resolution, the media file is played back using the other of the application or the web browser.

FIG. 2 illustrates a block diagram of a system according to at least one example embodiment. As shown in FIG. 2 the system 200 includes a device 205, a media server 255 and a license server 260. The device 205, the media server 255 and the license server 260 can be communicatively coupled via a wired and/or wireless network. The device 205 includes a processor 210, a memory 215 and a memory 225. The memory 215 can include a selection module 220, an application 240, and a web browser 250. The memory 215 can be a non-transitory computer readable medium.

The selection module 220 can be configured to read two or more keys, determine a resolution and/or other characteristic associated with each of the keys and select a play environment on the device 205 for playing of a media file based on the resolution associated with the keys and/or other characteristics. The remainder of FIG. 2 will be described with regard to resolution for clarity purposes. However, it will be understood that other characteristics associated with playing the media file on the device alone and/or in combination with resolution are within the scope of this disclosure.

According to some implementations, the resolution can be associated with display of a media file on a display of the device 205 and the play environment can be selected between an application and a web browser. A first key 230 can be stored in the memory 215 and/or the memory 225. The first key 230 can correspond to the device 205. In an example implementation, the first key 230 can correspond to an authorization of the device 205 to access a file (e.g., playing a media file). The first key 230 can have an associated quality of service (QoS) indicating the resolution for playing of a media file associated with the first key 230. For example, the first key 230 can indicate a resolution for playing of a media file on the device 205. The first key 230 can include metadata indicating the associated QoS within the first key 230 itself and/or the first key 230 can include a link (or other mechanism) used to access or acquire the associated QoS should the associated QoS be stored separate from the first key 230.

In an example implementation, the first key 230 can be associated with a Digital Rights Management (DRM) system or technology. DRM can control the management of rights to digital goods and content, including its confinement to authorized use and users and the management of any consequences of that use. DRM can be used as an encryption technology configured to permit content owners (e.g., as associated with the media server 255) to control user access to digital content, including the issue of licenses (e.g., using the license server 260) and decryption on the device. In an example implementation, the first key 230 can be a DRM key or DRM certificate corresponding to a license issued according to a DRM system or technology. The DRM system or technology can be implemented as an encrypted media extension. Therefore, the first key 230 can be an encrypted media extension key.

A second key 245 can be stored in the memory 215 and/or the memory 225. The second key 245 is associated with the application 240. The second key 245 can correspond to a quality of service (QoS) associated with the application 240 when the application 240 is executing on the device 205. For example, when the application 240 is installed on the device 205, the application 240 can be associated with a user account. Therefore, the second key 245 can be an activation key for the application and/or service (e.g., streaming media service). The user account can have an associated QoS indicating a resolution for playing of a media file. Therefore, the second key 245 can indicate a resolution for playing of a media file by the application 240 when the application 240 is executing on the device 205. The second key 245 can include metadata indicating the associated QoS within the second key 245 itself and/or the second key 245 can include a link (or other mechanism) used to access or acquire the associated QoS should the associated QoS be stored separate from the key.

In an example implementation, the selection module 220 can read the first key 230 from the memory 225 and can read second key 245 from the memory 215. The selection module 220 can then determine a resolution for playing of a media file for each of the first key 230 and the second key 245 based on, for example, a QoS associated with each of the first key 230 and the second key 245.

For example, upon determining the resolution for playing of the media file for the first key 230 is higher than the resolution for playing of the media file for the second key 245, the selection module 220 can select the web browser 250 for playing of the media file. For example, upon determining the resolution for playing of the media file for the second key 245 is higher than the resolution for playing of the media file for the first key 230, the selection module 220 can select the application 240 for playing of the media file. Alternatively (or in addition to), upon determining the resolution for playing of the media file for the first key 230 is equal to the resolution for playing of the media file for the second key 245, the selection module 220 can select either the web browser 250 or the application 240 for playing of the media file (e.g., based on a configuration setting).

In an example implementation, the first key 230 can be stored on (or a copy can be stored on) license server 260. Accordingly, the first key 230 can be communicated to the device 205. For example, during a startup or initialization process, the device 205 can request the first key 230 from the license server 260. For example, the device 205 can request the first key 230 from the license server 260 as needed. The license server 260 can communicate the first key 230 to the device 205 upon request. The device 205 can include an application programming interface (API) configured to communicate with the license server 260 in order to acquire the first key 230. For example, the API can be a module (implemented as software code) stored on memory 215.

FIG. 3 illustrates another flowchart of a method for selecting a play option for playing of a media file according to at least one example embodiment. As shown in FIG. 3, in step S305 playing of a media file is initiated. For example, playing of the media file can be initiated through a play operation on a webpage executing within the web browser 250. As another example, playing of the media file can be initiated through a play operation on the application 240. As yet another example, playing of the media file can be initiated via clicking on a link in an email or on a webpage.

In step S310 a first key associated with a device configured to execute a web browser is read. For example, the first key 230 can be read from the memory 215 or the memory 225. In step S315 a second key associated with an application configured to execute on the device is read. For example, the second key 245 can be read from the memory 215 or the memory 225. As discussed above, the first key 230 can correspond to an authorization of the device 205 to access a file (e.g., playing a media file). The first key 230 can have (or include a mechanism for use to access or acquire) an associated quality of service (QoS) indicating the resolution for playing of a media file associated with the first key 230. For example, the first key 230 can indicate a resolution (and/or other characteristics) for playing of a media file on the device 205.

Further, the second key 245 can correspond to (or include a mechanism for use to access or acquire) a quality of service (QoS) associated with the application 240 when the application 240 is executing on the device 205. For example, when the application 240 is installed on the device 205, the application 240 can be associated with a user account. The user account can have an associated QoS indicating a resolution for playing of a media file. Therefore, the second key 245 can indicate a resolution (and/or other characteristics) for playing of a media file by the application 240 when the application 240 is executing on the device 205.

In step S320, whether a resolution (and/or other characteristics) associated with playing of the media file is higher for playing of the media file by the web browser as compared to playing of the media file by the application based on the first key and the second key is determined. For example, the selection module 220 can compare the resolution associated with the first key 230 and the resolution associated with the second key 245. Accordingly, the greater of the two resolutions can be selected as the higher of the two resolutions. In other words, if the resolution associated with the first key 230 is greater than the resolution associated with the second key 245, the first key 230 has the higher associated resolution. As a result, playing of the media file by the web browser 250 is higher as compared to playing of the media file by the application 240. The remainder of FIG. 3 will be described with regard to resolution for clarity purposes. However, it will be understood that other characteristics associated with playing the media file on the device alone and/or in combination with resolution are within the scope of this disclosure.

If the playing of the media file by the application has a higher resolution (Yes in step S325), in step S330 the media file is played back using the application. Otherwise (No in step S325), in step 335 the media file is played back using the web browser. If the application and the web browser have a same associated resolution playing could be accomplished using either the application or the web browser. For example, if playing of the media file is initiated independent of the application and the web browser (e.g., via a link in an email) and the application has a higher associated resolution, the media file is played back using the application. Further, if playing of the media file is initiated by one of the application or the web browser and the other of the application or the web browser has a higher associated resolution, the media file is played back using the other of the application or the web browser.

In one example implementation, a streaming service can be implemented through the use of a web browser and an application. In other words, a subscriber to a streaming service can access content (e.g., a movie) using a web browser or an application. The device on which the web browser is to be executed can be customized or configured to implement a streaming service (e.g., preconfigured before sale for a streaming service). In other words, the device can be a streaming service enabled device. For example, device 205 can be a streaming service enabled device.

The example streaming service can also have an associated application that can be loaded onto and executed by the device. A user of the device can have a user account with the streaming service that can be implemented through a logon functionality of the application. For example, the application can be application 240. The streaming service enabled device can include a key (e.g., first key 230) indicating (or including a mechanism for use in accessing or acquiring) a QoS and a resolution for display of media delivered from the streaming service. In addition, the application associated with the streaming service can have a key (e.g., second key 245) indicating (or including a mechanism for use in accessing or acquiring) a QoS and a resolution for display of media delivered from the streaming service. The key associated with the application can be loaded on the device upon successful logon to the streaming service using the application.

According to the current example implementation, the streaming service enabled device (e.g., device 205) can playing the media (e.g., a movie) delivered or communicated from the streaming service to the streaming service enabled device using either the web browser or the application. Selecting the play method can be based on using the method having the highest (e.g., best user experience) resolution (e.g., authorized resolution). Accordingly, selection of the web browser (e.g., web browser 250) or the application (e.g., application 240) for playing of the media can be based on the key having the highest associated resolution.

In another example implementation, a file, video or content sharing service can be implemented through the use of a web browser and an application. In other words, a user of a file, video or content sharing service can access content (e.g., a movie, music, book or portion thereof) using a web browser or an application. The device on which the web browser is to be executed can be customized or configured to implement the file, video or content sharing service.

The example file, video or content sharing service can also have an associated application that can be loaded onto and executed by the device. A user of the device can have a user account with the file, video or content sharing service that can be implemented through a logon functionality of the application. For example, the application can be application 240. The device can include a key (e.g., first key 230) indicating a QoS and a resolution for display of media delivered from the file, video or content sharing service. In addition, the application associated with the file, video or content sharing service can have a key (e.g., second key 245) indicating a QoS and a resolution for display of media delivered from the file, video or content sharing service. The key associated with the application can be loaded on the device upon successful logon to the file, video or content sharing service using the application.

According to the current example implementation, the device (e.g., device 205) can play the media (e.g., a movie, music, book or portion thereof) delivered or communicated from the file, video or content sharing service to the device using either the web browser or the application. Selecting the playing method can be based on using the method having the highest (e.g., best user experience) resolution (e.g., authorized resolution). Accordingly, selection of the web browser (e.g., web browser 250) or the application (e.g., application 240) for playing of the media can be based on the key having the highest associated resolution.

In still another example implementation, a video conferencing service can be implemented through the use of a web browser and an application. In other words, users of a video conference service can access a video conference using a web browser or an application. The device on which the web browser is to be executed can be customized or configured to implement the video conferencing service through an authorization process including installation of a key (e.g., an encryption key).

The example video conferencing service can also have an associated application that can be loaded onto and executed by the device. A user of the device can have a user account with the video conferencing service that can be implemented through a logon functionality of the application. For example, the application can be application 240. The device can include a key (e.g., first key 230) indicating (or including a mechanism for use in accessing or acquiring) a QoS and a resolution for display of video and/or playing of audio communicated via video conferencing service. In addition, the application associated with the video conferencing service can have a key (e.g., second key 245) indicating (or including a mechanism for use in accessing or acquiring) a QoS and a resolution for display of video and/or playing of audio communicated via video conferencing service. The key associated with the application can be loaded on the device upon successful logon to the video conferencing service using the application.

According to the current example implementation, the device (e.g., device 205) can display video and/or play audio communicated via video conferencing service using either the web browser or the application. Selecting the display method can be based on using the method having the highest (e.g., best user experience) resolution (e.g., authorized resolution). Accordingly, selection of the web browser (e.g., web browser 250) or the application (e.g., application 240) for display of the video/audio can be based on the key having the highest associated resolution.

FIG. 4 shows an example of a computer device 400 and a mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, tablets, smart phones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452, that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, Wi-Fi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smart phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:
    initiating play of a media file on a device, the media file being associated with an access control measure used to prevent unauthorized access to the media file;
    reading a first key associated with the device configured to execute a web browser, the first key being configured to authorize access to the media file;
    reading a second key associated with an application configured to execute on the device, the second key being configured to authorize access to the media file;
    determining, based on the first key and the second key, whether a characteristic associated with playing the media file is higher for the playing of the media file by the web browser as compared to playing of the media file by the application;
    in response to determining the characteristic associated with playing the media file is higher for the playing of the media file by the web browser,
        initiating execution of the web browser on the device, and
        playing the media file with the web browser; and
    in response to determining the characteristic associated with playing the media file is higher for the playing of the media file by the application,
        initiating execution of the application on the device, and
        playing the media file with the application.

2. The method of claim 1, wherein the characteristic associated with playing the media file is resolution.

3. The method of claim 1, wherein the first key is a Digital Rights Management (DRM) key or DRM certificate.

4. The method of claim 1, wherein the first key can be used to determine if the device has been tampered with.

5. The method of claim 1, wherein
    the first key is stored on a license server, and
    the first key is read using an application programming interface (API) executing together with the web browser, the API is configured to communicate with the license server and to read the first key from the license server.

6. The method of claim 1, wherein the first key is an encrypted media extension key.

7. The method of claim 1, wherein the playing of the media file is initiated using the application.

8. The method of claim 1, wherein the playing of the media file is initiated using the web browser.

9. The method of claim 1, wherein the second key is associated with a user account of a user of the application.

10. The method of claim 1, wherein
    the second key is associated with quality of service for a user account of a user of the application, and
    the quality of service indicates a resolution associated with playing of the media file by the application.

11. A device comprising;
    a processor;
    a first memory configured to store a first key; and
    a second memory configured to store instructions that when executed by the processor cause the device to:
        initiate play of a media file on the device, the media file being associated with an access control measure used to prevent unauthorized access to the media file,
        read the first key associated with the device, the first key being configured to authorize access to the media file,
        read a second key associated with an application configured to execute on the device, the second key being configured to authorize access to the media file,
        determine, based on the first key and the second key, whether a characteristic associated with playing the media file is higher for the playing of the media file by a web browser as compared to playing of the media file by the application,
        in response to determining the characteristic associated with playing the media file is higher for the playing of the media file by the web browser,
            initiate execution of the web browser on the device, and
            play the media file with the web browser, and
        in response to determining the characteristic associated with playing the media file is higher for the playing of the media file by the application,
            initiate execution of the application on the device, and
            play the media file with the application.

12. The device of claim 11, wherein the characteristic associated with playing the media file is resolution.

13. The device of claim 11, wherein the first key is a Digital Rights Management (DRM) key or DRM certificate.

14. The device of claim 11, wherein
    the first key is stored on a license server, and
    the first key is read using an application programming interface (API) executing together with the web browser, the API is configured to communicate with the license server and to read the first key from the license server.

15. The device of claim 11, wherein the first key is an encrypted media extension key.

16. The device of claim 11, wherein the playing of the media file is initiated using the application.

17. The device of claim 11, wherein the playing of the media file is initiated using the web browser.

18. The device of claim 11, wherein the second key is associated with a user account of a user of the application.

19. The device of claim 11, wherein
the second key is associated with quality of service for a user account of a user of the application, and
the quality of service indicated a resolution associated with playing of the media file by the application.

20. A non-transitory computer readable medium having code segments stored thereon, the code segments, when executed by a processor cause the processor to:
initiate play of a media file, the media file being associated with an access control measure used to prevent unauthorized access to the media file;
determine, based on a first key and a second key, whether a characteristic associated with playing the media file is higher for the playing of the media file by a web browser as compared to playing of the media file by an application, the first key being configured to authorize access to the media file and the second key being configured to authorize access to the media file;
in response to determining the characteristic associated with playing the media file is higher for the playing of the media file by the web browser,
initiate execution of the web browser, and
play the media file with the web browser; and
in response to determining the characteristic associated with playing the media file is higher for the playing of the media file by the application,
initiate execution of the application, and
play the media file with the application.

* * * * *